United States Patent [19]

Yokomatsu et al.

[11] Patent Number: 5,090,741
[45] Date of Patent: Feb. 25, 1992

[54] HOSE END FITTING

[75] Inventors: Takahiro Yokomatsu; Kenji Mine; Shinichiro Kato, all of Tokyo, Japan

[73] Assignee: Bridgestone Flowtech Corporation, Tokyo, Japan

[21] Appl. No.: 372,660

[22] Filed: Jun. 23, 1989

[30] Foreign Application Priority Data

Sep. 14, 1988 [JP] Japan ................. 63-231579

[51] Int. Cl.⁵ .................................. F16L 17/04
[52] U.S. Cl. ................... 285/101; 285/249; 285/323; 285/113
[58] Field of Search ........... 285/113, 245, 249, 256, 285/321, 323, 353, 385, 255, 101, 105

[56] References Cited

U.S. PATENT DOCUMENTS

| | | | |
|---|---|---|---|
| 2,460,653 | 2/1949 | Raybould | 285/249 |
| 2,513,115 | 6/1950 | Sprigg | 285/249 |
| 2,935,343 | 5/1960 | Ellis | 285/321 X |
| 4,157,843 | 6/1979 | Trnka et al. | 285/255 X |
| 4,229,029 | 10/1980 | Boyer et al. | 285/323 X |
| 4,282,175 | 8/1981 | Volgstadt et al. | 285/105 X |
| 4,798,404 | 1/1989 | Iyanicki | 285/249 X |
| 4,906,028 | 3/1990 | Yokomatsu et al. | 285/101 |
| 4,906,030 | 3/1990 | Yokomatsu et al. | 285/101 X |

FOREIGN PATENT DOCUMENTS

| | | | |
|---|---|---|---|
| 1093151 | 11/1960 | Fed. Rep. of Germany | 285/249 |
| 1095068 | 12/1960 | Fed. Rep. of Germany | 285/249 |
| 2340717 | 2/1974 | Fed. Rep. of Germany | 285/249 |
| 1496737 | 10/1967 | France | 285/249 |
| 62-130286 | 3/1987 | Japan . | |
| 314488 | 10/1930 | United Kingdom | 285/353 |

Primary Examiner—Randolph A. Reese
Assistant Examiner—Jeffrey L. Thompson
Attorney, Agent, or Firm—Lane, Aitken & McCann

[57] ABSTRACT

A hose end fitting for sealed connection to a hose, comprising: a first cylindrical member having a reduced diameter bore portion and an enlarged diameter bore portion connected to the reduced diameter bore portion; a second cylindrical member axially slidable within the enlarged diameter bore portion of the first cylindrical member and having a radial flange portion and an axial tubular portion extending from the radial flange portion, the radial flange portion being provided with a sealing member, and the axial tubular portion being provided with a sealing member; hose end gripping means provided within the enlarged diameter bore portion of the first cylindrical member and radially expandable and constrictable, the hose being gripped by the hose end gripping means which is radially constricted by axial outward movement of the second cylindrical member; and stopping means received in the enlarged diameter bore portion and adapted to limit axial movement of the second cylindrical member and the hose end griping means.

23 Claims, 7 Drawing Sheets

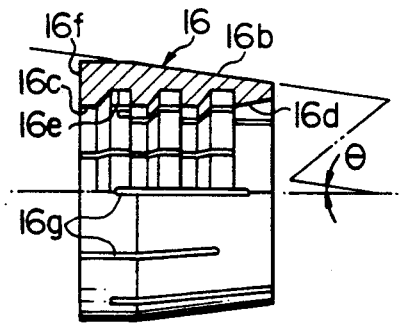
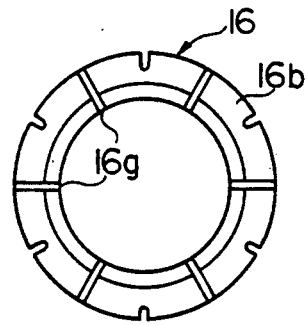
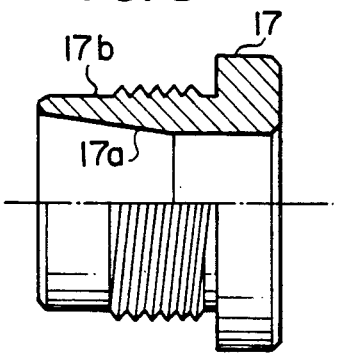
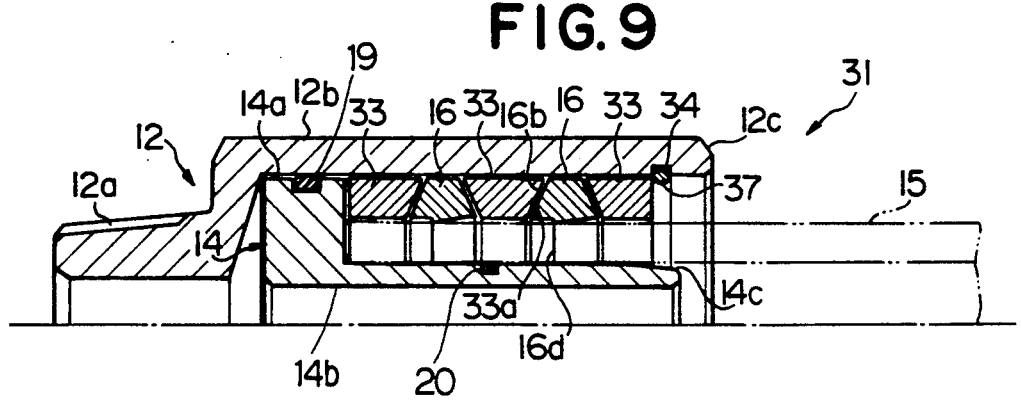

HOSE END FITTING

FIELD OF THE INVENTION

This invention relates generally to hose coupling devices for sealed connection to a hose and more particularly to a quick attachable hose end fitting or coupling adapted to connect a hose having a composite structure of an inner tube, intermediate reinforcing layer, outer cover and the like, without using tools for clamping or crimping, and also to a quick attachable hose end fitting or coupling wherein there is no incidence of torsion on the hose when the fitting is connected to a fluid system.

DESCRIPTION OF THE PRIOR ART

A hydraulic hose employed in the fluid passageway of high-pressure fluid of a normal pressure of more than 30 kg/cm$^2$, generally has a composite structure which includes an inner tube, intermediate reinforcing layer, outer cover and the like. As a hose end fitting of such a hydraulic hose which is suitable for connection at work fields, there are known hose end fittings which require no crimping devices.

A conventional hose end fitting of this kind has been proposed for example in Japanese utility model laid open publication No. 62-130286. In this fitting, as shown in FIG. 19, between a main body 2 of a hose end fitting 1 and a nut 3 meshing with the main body 2 there are interposed press rings 4 and 4 and a spacer ring 5, the hose end of a hose 6 is inserted between the insert portion 2a of the main body 2 and the press rings 4, and the press rings 4 are moved radially inward to bite into the hose end by advancing the nut 3 on the main body 2 with the aid of tools such as spanners and the like, thereby connecting the hose end of the hose 6 to the hose end fitting 1. For this reason, although the press rings 4 are not rotated directly, the press rings 4 and the spacer ring 5 rotate as the nut 3 rotates, because of the friction between taper surfaces of the parts contacting each other. Since the press rings 4 have bitted into the hose 6 with rotation of the press rings 4 and the spacer ring 5, it is difficult to completely prevent the hose 6 from being rotated together. The hose 6 therefore tends to produce torsion thereon, if the other end of the hose is fixed at the time of connection. Furthermore, there are drawbacks that the connecting operation takes a substantial time and that the working efficiency is reduced.

Accordingly, it is an object of the present invention to provide a novel hose end fitting which is capable of quickly connecting thereto a hose of composite structure employed in high-pressure fluid, without using crimping or clamping tools.

An additional object of the present invention is to provide a novel quick attachable hose end fitting which is capable of readily being connected at work fields.

A further object of the present invention is to provide a novel quick attachable hose end fitting which is capable of connecting the fitting to other fluid systems without imparting torsion to the hose in the connection of the fitting to the systems.

SUMMARY OF THE INVENTION

In accordance with one important aspect of the present invention, there is provided a hose end fitting for sealed connection to a hose, comprising: a first cylindrical member having a reduced diameter bore portion and an enlarged diameter bore portion connected to the reduced diameter bore portion, the reduced diameter bore portion being formed with an axial reduced bore extending therethrough and the enlarged diameter bore portion being formed with an axial enlarged bore extending therethrough; a second cylindrical member axially slidable within the axial enlarged bore of the enlarged diameter bore portion of the first cylindrical member and having a radial flange portion and an axial tubular portion extending from the radial flange portion, the radial flange portion being provided with a sealing member, and the axial tubular portion being formed with a through bore communicating with the axial reduced bore of the reduced diameter bore portion of the first cylindrical member and provided with a sealing member; hose end griping means provided within the axial enlarged bore of the enlarged diameter bore portion of the first cylindrical member and radially expandable and constrictible, the hose being gripped by the hose end griping means which is radially constricted by axial outward movement of the second cylindrical member; and stopping means received in the enlarged diameter bore portion and adapted to limit axial movement of the second cylindrical member and the hose end griping means.

The second cylindrical member may further have a receiving portion extending axially outward from the radial flange portion and having an inner inclined end face, and the stopping means may comprise a stop member having an externally threaded shank portion with an inner inclined end face, and the hose end griping means may comprise an annular crimping ring having at its one end an outer inclined end face engageable with the inner inclined end face of the receiving portion of the second cylindrical member and at the other end an outer inclined end face engageable with the inner inclined end face of the stop member. The crimping ring may be formed with a cutout axially extending therethrough and has a plurality of circumferential ridges projecting radially inward from an inner peripheral surface of the crimping ring, each ridge having an inner diameter equal to or smaller than an outer diameter of the hose.

The stopping means may also comprise a stop member having an externally threaded shank portion with an inner frustoconical surface and the hose end griping means may also comprise an annular crimping ring having at its one end a flat end face engageable with the radial flange portion of the second cylindrical member and at its outer periphery an outer frustoconical surface engageable with the inner frustoconical surface of the stop member. The crimping ring may also be formed at its outer periphery with a plurality of axially extending slits and at its inner periphery with a plurality of circumferentially extending grooves and a circumferential teeth projecting radially inward from the inner periphery, the teeth having an inner diameter equal to or smaller than an outer diameter of the hose.

In accordance with another important aspect of the present invention, there is provided a hose end fitting for sealed connection to a hose, comprising: a first cylindrical member having a reduced diameter bore portion and an enlarged diameter bore portion connected to the reduced diameter bore portion, the reduced diameter bore portion being formed with an axial reduced bore extending therethrough and the enlarged diameter bore portion being formed with an axial enlarged bore extending therethrough; a second cylindrical member axially slidable within the axial enlarged bore of the enlarged diameter bore portion of the first cylindrical member and having a radial flange portion and an axial tubular portion extending from the radial flange portion, the radial flange portion being provided with a sealing member, and the axial tubular portion being formed with a through bore communicating with the axial reduced bore of the reduced diameter bore portion of the first cylindrical member and provided with a sealing member; hose end gripping means provided within the axial enlarged bore of the enlarged diameter bore portion of the first cylindrical member and radially expandable and constrictible, the hose being gripped by the hose end gripping means which is radially constricted by axial outward movement of the second cylindrical member; a plurality of receiving rings disposed to interposed the hose end griping means; and stopping means received in the enlarged diameter bore portion and adapted to limit axial movement of the second cylindrical member, the hose end gripping means and the receiving rings.

The hose end gripping means may comprise a plurality of annular crimping rings each having outer inclined end faces at its opposite ends, and the stopping means may comprise an annular stop ring and the receiving rings may have inner inclined end faces engageable with the outer inclined end faces of the crimping rings. Each of the crimping rings may be formed with a cutout axially extending therethrough and have a circumferential tooth projecting radially inward from an inner peripheral surface of the crimping ring and having an inner diameter equal to or smaller than an outer diameter of the hose.

The hose end griping means may also comprise an annular crimping ring having first and second outer inclined end faces and the stopping means may also comprise an annular stop ring and the plurality of receiving rings may also comprise an inner receiving ring interposed between the radial flange portion of the second cylindrical member and the crimping ring and having an inner inclined end face engageable with the first outer inclined end face of the crimping ring, and an outer receiving ring interposed between the crimping ring and the stop ring and having an inner inclined end face engageable with the second outer inclined end face of the crimping ring.

The hose end fitting may further comprise a chuck ring interposed between the inner receiving ring and the crimping ring. The chuck ring may have at its inner periphery radially inwardly projecting sharp edges which are radially expandable and constrictible, each edge having an inner diameter equal to or smaller than an outer diameter of the hose. The chuck ring may be formed from spring steel such as stainless steel and the like and frustoconical in shape.

The hose end griping means may also comprise an annular crimping ring having first and second outer inclined end faces, and the stopping means may also comprise an annular stop ring, and the plurality of receiving rings may also comprise an inner receiving ring, an intermediate receiving ring, and an outer receiving ring, the inner receiving ring being interposed between the radial flange portion of the second cylindrical member and the crimping ring and having an inner inclined end face engageable with the first outer inclined end face of the crimping ring, the intermediate receiving ring having an inner inclined end face engageable with the second outer inclined end face of the crimping ring.

The hose end fitting may further comprise a chuck ring interposed between the intermediate and outer receiving rings. The chuck ring may be formed with an axial cutout extending therethrough and have at its inner periphery a radially inwardly projecting sharp edge which is radially expandable and constrictible and has an inner diameter equal to or smaller than an outer diameter of the hose. The chuck ring may be formed from steel such as spring steel and the like or plastics material such as polyacetal, nylon and the like, and flat in shape.

BRIEF DESCRIPTION OF THE DRAWINGS

The above and other objects and advantages will become apparent from the following detailed description when read in conjunction with the accompanying drawings wherein:

FIG. 7A is a side view, partly in section, showing the annular crimping ring shown in FIG. 5;

FIG. 7B is an end view showing the annular crimping ring shown in FIG. 5;

FIG. 8 is a side view, partly in section, showing the stop member shown in FIG. 5;

FIG. 9 is a longitudinal sectional view showing a hose end fitting constructed in accordance with a third embodiment of the present invention;

DESCRIPTION OF THE PREFERRED EMBODIMENTS

Figure 1:
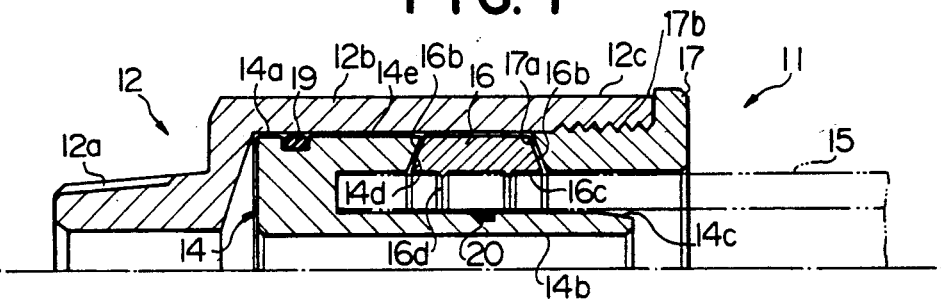
FIG. 1 is a longitudinal sectional view showing a hose end fitting constructed in accordance with a first embodiment of the present invention.

Referring now in greater detail to the drawings and initially to FIGS. 1 through 4, there is shown a hose end fitting 11 for sealed connection to a hose, which is constructed in accordance with a first embodiment of the present invention.

The hose end fitting 11 comprises a main body 12 as a first cylindrical member and a core member 14 as a second cylindrical member which is disposed in coaxial relationship to the main body 12.

The main body 12 of the hose end fitting 11 has an axially inner reduced diameter bore portion 12a formed with a reduced bore extending therethrough, and an axially outer enlarged diameter bore portion 12b extending axially outward from the reduced diameter bore portion 12a and formed with an enlarged bore extending therethrough.

The core member 14 of the hose end fitting 11 has a radial flange portion 14a axially slidable within the enlarged bore of the enlarged diameter bore portion 12b, and an axial tubular portion 14c extending axially outward from the radial flange portion 14a and formed with an axial through bore 14b communicating with the reduced bore of the reduced diameter bore portion 12a. It is here noted that the inner diameter of the enlarged diameter bore portion 12b is 20 mm.

Figure 3A:
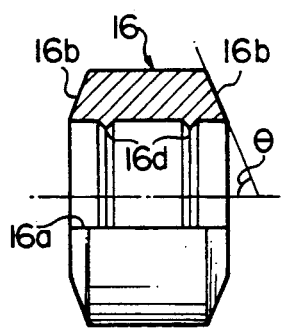
FIG. 3A is a side view, partly in section, showing the annular crimping ring shown in FIG. 1.
Figure 3B:
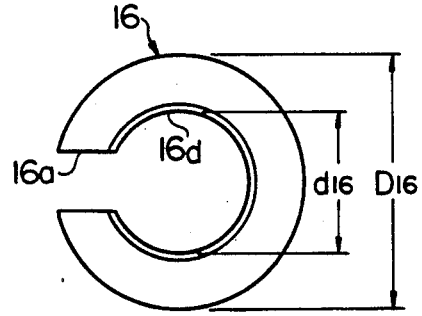
FIG. 3B is an end view showing the annular crimping ring shown in FIG. 1.
Figure 4:
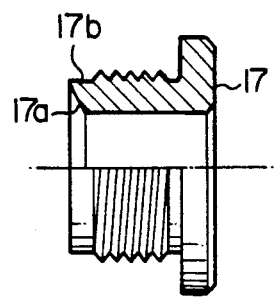
FIG. 4 is a side view, partly in section, showing the stop member shown in FIG. 1.

As shown in FIGS. 3A and 3B, an annular crimping ring or hose end gripping means 16 is provided within the enlarged diameter bore portion 12b of the main body 12 for gripping a hose 15 to be described hereinafter. The annular crimping ring 16 is formed with an axially extending cutout 16a so that it can be radially expandable and constrictible, and has at its opposite end outer inclined end faces 16b and 16b, each outer inclined end face narrowing outward at angle $\theta$ of 60° relative to the longitudinal center axis of the ring 16. The angle $\theta$ is preferable to be 4° to 60°, more preferably 30° to 60°. The annular crimping ring 16 has an outer diameter $D_{16}$ of 19.6 mm slightly smaller than the inner diameter of the enlarged diameter bore portion 12b, and is provided with a plurality of circumferential ridges 16d projecting radially inward from an inner peripheral surface 16c of the ring 16, each ridge 16d having an inner diameter $d_{16}$ of 14.9 mm slightly smaller than the outer diameter 15 mm of the hose 15. The inner diameter of each ridge 16d is preferable to be equal to or smaller than the outer diameter of the hose by 0.05 to 1 mm, more preferably 0.05 to 0.3 mm.

At its open end portion 12c the enlarged diameter bore portion 12b of the main body 12 is provided with an internally threaded portion to receive an externally threaded shank portion 17b of a stop member or stopping means 17 whereby the radial flange portion 14a of the core member 14 and the crimping ring 16 are retained within the enlarged diameter bore portion 12b. The shank portion 17b of the stop member 17 has at its axial inner end an inner inclined end face 17a engageable with one outer inclined end face 16b of the crimping ring 16 and having substantially the same angle of taper as the inclined end face 16b. The core member 14 is provided with a receiving portion 14e which extends axially outward from the radial flange portion 14a and has an inner inclined end face 14d engageable with the other outer inclined end face 16b of the crimping ring 16. The inner inclined end face 14d of the receiving portion 14e has substantially the same angle of taper as the inclined end face 16b.

An annular O-ring 19 is received in a circumferential groove formed on the outer periphery of the radial flange portion 14a of the core member 14 for providing a seal between the main body 12 and the flange portion 14a. In addition, an annular O-ring 20 is received in a circumferential groove formed at a position opposite the crimping ring 16 on the outer periphery of the axial tubular portion 14b of the core member 14 for providing a seal between the axial tubular portion 14b and the inner tube of the hose 15 inserted.

When the hose end fitting 11 thus described above is assembled, the O-ring 19 is fitted in the circumferential groove of the outer periphery of the radial flange portion 14a of the core member 14, and the O-ring 20 is fitted in the circumferential groove of the outer periphery of the axial tubular portion 14b of the core member 14. The core member 14 is then inserted from the open end portion 12c of the main body 12 until it comes into abutting contact with the end wall between the reduced diameter bore portion 12a and the enlarged diameter bore portion 12b, and the crimping ring 16 is inserted until the outer inclined end face 16b thereof abuts the inner inclined end face 14d of the receiving portion 14e of the core member 14. Thereafter, the stop member 17 is screwed inside the main body 12 and fixed so that the inner inclined end face 17a of the stop member 17 can contact the outer inclined end face 16b of the crimping ring 16.

Figure 2:
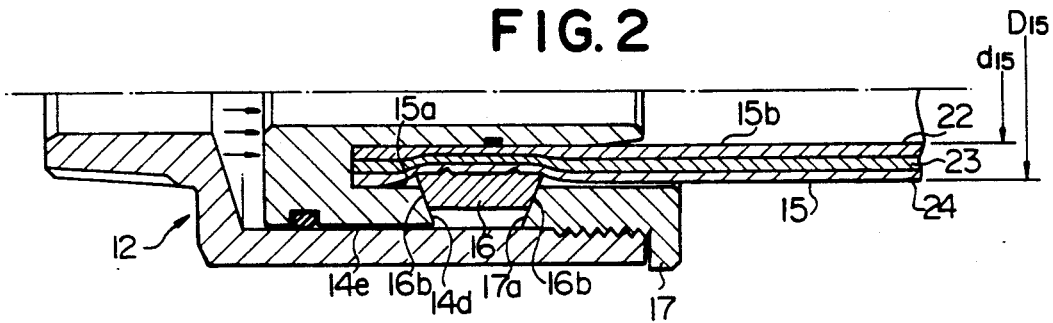
FIG. 2 is a longitudinal sectional view showing the hose connected to the hose end fitting of FIG. 1 by the axial outward movement of the core member shown in FIG. 1 from the position of FIG. 1.

As shown in FIG. 2, the hose 15 is a high-pressure hose of a composite structure having an inner diameter $d_{15}$ of 10 mm and an outer diameter $D_{15}$ of 15 mm, and comprises an inner tube 22 made of nylon resin, an intermediate reinforcing layer 23 made of polyester fiber, and an outer cover 24 made of polyurethan. The distal end 15a of the hose 15 passes axially inward and is inserted to the fully inserted position wherein the distal end 15a abuts the flange portion 14a of the core member 14.

Thereafter, if internal pressure is applied through the reduced bore of the reduced diameter bore portion 12a of the main body 12 to the axially inner end face of the flange portion 14a of the core member 14, the core member 14 is shifted axially outward toward the stop member 17, and the crimping ring 16 contacts the core member 14 and is shifted with the core member 14. The crimping ring 16 is then radially inward constricted while it is moving axially with the opposite outer inclined end faces 16b and 16b of the crimping member 16 respectively contacted with the inner inclined end face 14d of the receiving portion 14e and the inner inclined end face 17a of the stop member 17. Consequently, the distal end 15a of the hose 15 is gripped and connected by the crimping ring 16 and the axial tubular portion 14c of the core member 14.

The operation of the hose end fitting 11 constructed as described above will hereinafter be described in detail.

As shown by the two-dot chain lines in FIG. 1, the distal end 15a of the hose 15 is fitted over the axial tubular portion 14c of the core member 14 until the distal end 15a abuts the flange portion 14a of the core member 14. At this time, the inner peripheral surface 16c of the crimping ring 16 is expanded radially outward, and then the inner circumferential ridges 16d of the crimping ring 16 firmly engages the hose 15 so as to bite on the outer layer of the hose 15 by the restoring force of the radially outwardly expanded crimping ring 16. As a result, the hose 15 is prevented from sliding and being removed from the hose end fitting 11. The inner surface 15b of the inserted hose 15 tightly contacts the O-ring 20 in the axial tubular portion 14c of the core member 14 to form a seal between the inner surface 15b of the hose 15 and the tubular portion 14b, and thus there is no leakage of fluid from the hose end fitting 11, even in the case that the internal pressure of the fitting 11 is under zero pressure or substantially zero pressure.

As the hose end fitting 11 has the crimping ring 16 within the enlarged diameter bore portion 12b of the main body 12, if internal pressure is applied to the hose end fitting 11, the radial flange portion 14a of the core member 14 is shifted axially outward toward the stop member 17 due to the internal pressure within the reduced diameter bore portion 12a, and at the same time the crimping ring 16 contacts the radial flange portion 14a of the core member 14 and moves with the core member 14. As a result of the movement of the core member 14 from the position of FIG. 1 to the position of FIG. 2, the outer inclined end faces 16b and 16b of the crimping ring 16 are brought into engagement with the inner inclined end face 14d of the receiving portion 14e of the core member 14 and with the inner inclined end face 17a of the stop member 17, the cutout 16a of the crimping ring 16 is narrowed, and the crimping ring 16 is constricted radially inward. Consequently, the inner circumferential ridges 16d of the crimping ring 16 bite into the distal end 15a of the hose 15, and the hose 15 is gripped and connected to the hose end fitting 11. Thus, by simply inserting the hose 15 into the hose end fitting 11, the hose 15 is gripped and connected to the hose end fitting 11 only by the internal pressure within the reduced diameter bore portion 12a of the hose end fitting 11. Accordingly, the hose end fitting 11 according to the present invention requires no tools for crimping, and is capable of very easily and quickly connecting the hose 15 thereto.

In addition, when the hose end fitting 11 is connected to a high-pressure fluid system, the hose 15 is rotatable relative to the core member 14 or the main body 12, in the condition that the hose 15 is inserted between the axial tubular portion 14c of the core member 14 and the crimping ring 16 and that the crimping ring 16 firmly engages the hose 15. Accordingly, the hose end fitting 11 is capable of being connected to the high-pressure fluid system by rotating the main body 12 of the fitting without twisting the hose 15.

Referring to FIGS. 5 through 8, there is shown a hose end fitting 26 for sealed connection to a hose, which is constructed in accordance with a second embodiment of the present invention. The parts and members substantially identical to those of the above-described first embodiment are designated by like reference numerals for avoiding the detailed description.

Figure 5:
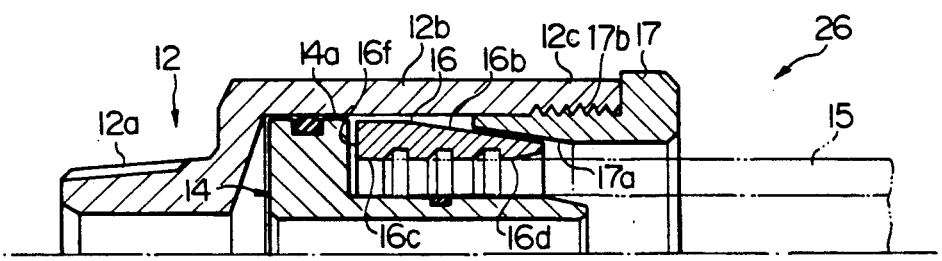
FIG. 5 is a longitudinal sectional view showing a hose end fitting constructed in accordance with a second embodiment of the present invention.
Figure 6:
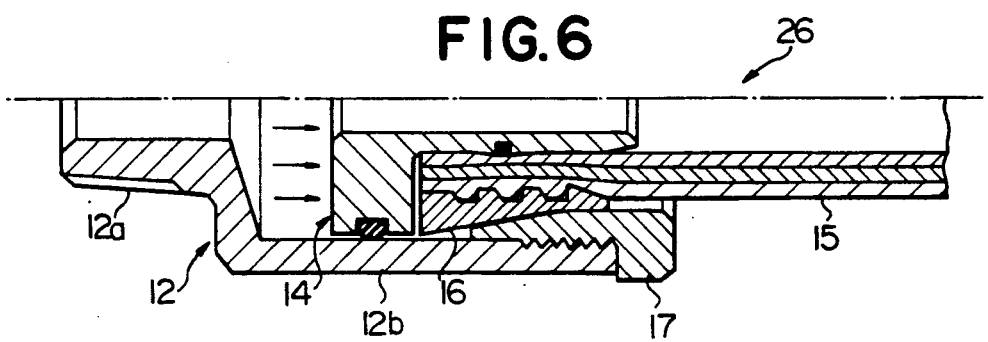
FIG. 6 is a longitudinal sectional view showing the hose connected to the hose end fitting of FIG. 5 by the axial outward movement of the core member shown in FIG. 5 from the position of FIG. 5.
Figure 10:
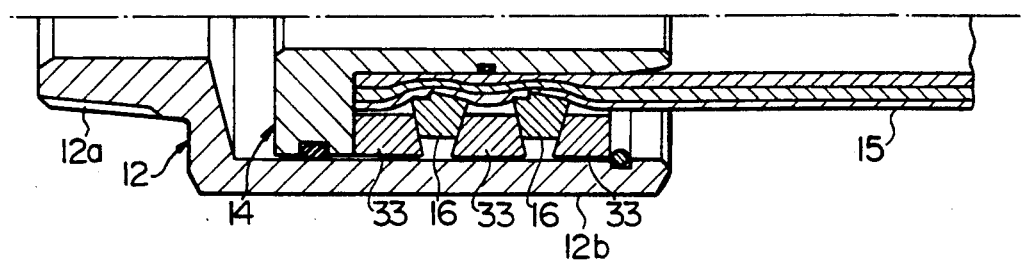
FIG. 10 is a longitudinal sectional view showing the hose connected to the hose end fitting of FIG. 9 by the axial outward movement of the core member shown in FIG. 9 from the position of FIG. 9.
Figure 11A:
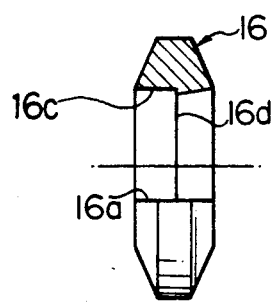
FIG. 11A is a side view, partly in section, showing the annular crimping ring shown in FIG. 9.
Figure 11B:
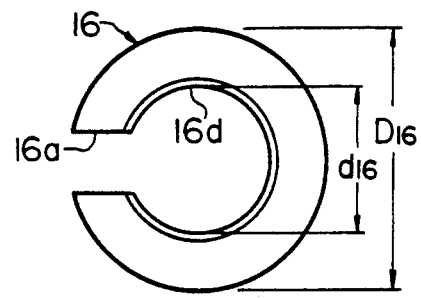
FIG. 11B is an end view showing the annular crimping ring shown in FIG. 9.

The hose end fitting 26 shown in FIG. 5 includes a single annular crimping ring 16 within an enlarged diameter bore portion 12b of a main body 12 of the fitting 26, and a stop member 17 (FIG. 8) having an externally threaded shank portion 17b with an inner frustoconical surface 17a. As shown in FIGS. 7A and 7B, the annular crimping rig 16 has at its outer periphery an outer frustoconical surface 16b engageable with the inner frustoconical surface 17a of the stop member 17 and at its inner axial end a vertical flat end 16f engageable with a radial flange portion 14a of a core member 14. The outer frustoconical surface 16b of the crimping member 16 narrows axially outward toward the stop member 17 at an angle $\theta$ of 5° relative to the longitudinal axis of the crimping member 16. To make the crimping member 16 radially expandable and constrictible, the crimping member 16 is formed at its outer periphery with a plurality of axially extending slits 16g instead of the axial cutout 16a in the first embodiment. The crimping member 16 is further provided with three circumferential grooves 16e at the inner periphery 16c thereof to assure that the distal end 15a of the hose 15 is gripped and connected. The crimping member 16 is also provided with a circumferential tooth 16d projecting radially inward from the outer end of the inner periphery 16c of the crimping member 16 in order to prevent the hose 15 from sliding and being removed from the hose end fitting 26. The inner diameter of the circumferential tooth 16d is preferable to be equal to or smaller than the outer diameter of the hose by 0.05 to 1 mm, more preferably 0.05 to 0.3 mm.

Referring to FIGS. 9 through 12, there is shown a hose end fitting 31 for sealed connection to a hose, which is constructed in accordance with a third embodiment of the present invention. The parts and members substantially identical to those of the first embodiment are designated by like reference numerals for avoiding the detailed description.

In the hose end fitting 31 shown in FIG. 9, two annular crimping rings 16 each having a circumferential tooth 16d and three annular receiving rings or receiving means 33 having inner inclined end faces 33a engageable with outer inclined end faces 16b of the crimping rings 16 are alternately disposed within an enlarged diameter bore portion 12b of a main body 12 of the fitting 31, and an annular stop ring or stopping means 37 is received in a circumferential groove 34 formed on the inner periphery of the enlarged diameter bore portion 12b adjacent an open end 12c in order that a core member 14, the crimping ring 16 and the receiving rings 33 are retained within the enlarged diameter bore portion 12b. It is here noted that the outer diameter $D_{33}$ of the receiving ring 33 is 19.6 mm and the inner diameter $d_{33}$ is 15.2 mm.

At the time of insertion, the hose end fitting 31 15 firmly engages the hose 15 at two positions by the circumferential teeth 16d and 16d of the two crimping rings 16. If the core member 14 is then shifted from the position of FIG. 9 to the position of FIG. 10, the hose 15 is gripped and connected by the two crimping rings 16. Since in this embodiment there are provided two crimping rings 16, the hose 15 is more tightly gripped than the first embodiment. Even after the hose 15 has been connected to the hose end fitting 31, it is rotatable with respect to the main body 12 of the hose end fitting 31 if the internal pressure is made zero. Accordingly, the hose end fitting 31 also can be connected to a high-pressure fluid system without twisting the hose 15.

Figure 12A:
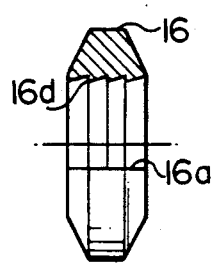
FIG. 12A is a side view, partly in section, of an alternate crimping ring for use in the hose end fitting of FIG. 9.
Figure 12B:
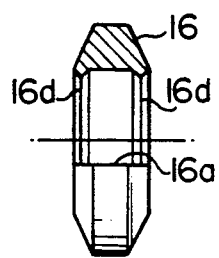
FIG. 12B is a side view, partly in section, of another alternate crimping ring for use in the hose end fitting of FIG. 9.
Figure 12C:
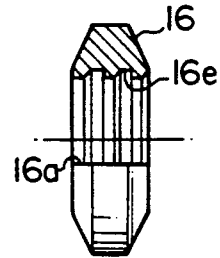
FIG. 12C is a side view, partly in section, of another alternate crimping ring for use in the hose end fitting of FIG. 9.

It is noted that the single circumferential tooth 16d of the crimping ring 16 may be replaced with a serrated portion 16d as shown in FIG. 12A. The crimping ring 16 may also be provided with a plurality of circumferentially extending grooves 16e each having trapezoidal section, as shown in FIG. 12C. Further, the crimping ring 16 may be provided with circumferential ridges 16d and 16d at the opposite ends of the inner periphery, as shown in FIG. 12B. The inner diameter of each of the circumferential teeth, serrated portion, grooves and ridges is preferable to be equal to or smaller than the outer diameter of the hose by 0.05 to 1 mm, more preferably 0.05 to 0.3 mm.

Figure 13:
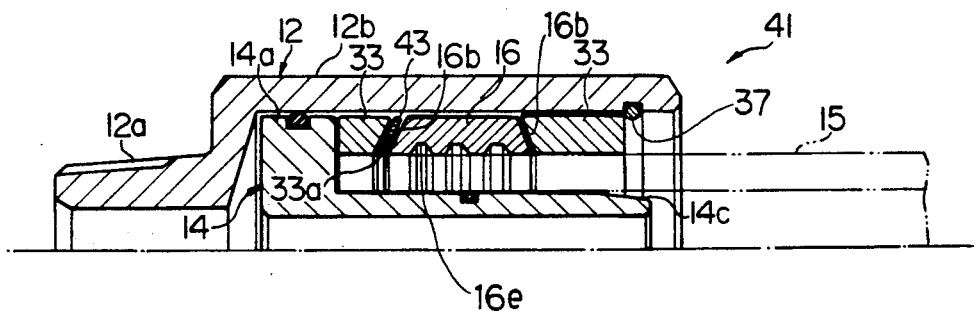
FIG. 13 is a longitudinal sectional view showing a hose end fitting constructed in accordance with a fourth embodiment of the present invention.
Figure 14:
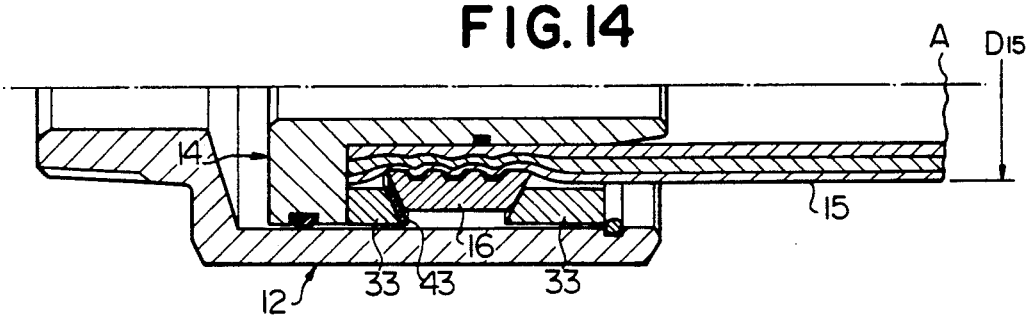
FIG. 14 is a longitudinal sectional view showing the hose connected to the hose end fitting of FIG. 13 by the axial outward movement of the core member shown in FIG. 13 from the position of FIG. 13.

Referring to FIGS. 13 through 15, there is shown a hose end fitting 41 constructed in accordance with a fourth embodiment of the present invention. The parts and members substantially identical to those of the second embodiment are designated by like reference numerals for avoiding the detailed description.

Figure 15A:
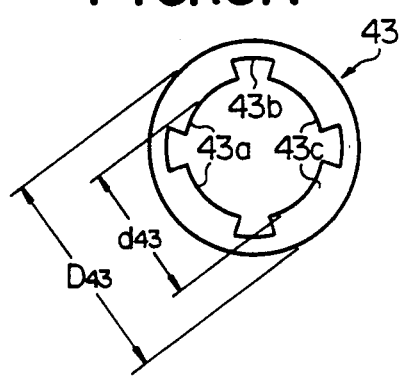
FIG. 15A is an end side showing the chuck ring shown in FIG. 13.
Figure 15B:
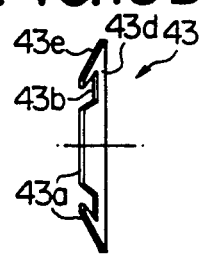
FIG. 15B is a cross-sectional view showing the chuck ring shown in FIG. 13.

The fourth embodiment shown in FIG. 13 is characterized in that two inner and outer annular receiving rings 33 are disposed within an enlarged diameter bore portion 12b of a main body 12 of the hose end fitting 41 so as to interpose a single annular crimping ring 16 therebetween and that an annular chuck ring 43 is interposed between the inner receiving ring 33 and the crimping ring 16. The chuck ring 43 has at its one end an inner inclined face 43d engageable with an outer inclined end face 16b of the crimping ring 16 and at the other end an outer inclined face 43e engageable with an inner inclined end face 33a of the inner receiving ring 33. The inner and outer inclined faces 43d and 43e of the chuck ring 43 are preferable to incline at angle of 4° to 60° relative to the center axis of the chuck ring 43. The chuck ring 43 is formed from spring steel such as stainless steel and the like and frustoconical in shape, as shown in FIGS. 15A and 15B. The chuck ring 43 has a smaller diameter $d_{43}$ than the outer diameter $D_{15}$ of the hose 15 that is to be passed through the central portion of the chuck ring 43, and also has radially inward projecting sharp edges 43a which are expandable and constrictible and can be restored. The chuck ring 43 is further provided with slits 43b between the sharp edges 43a. For this configuration, when the hose 15 is inserted from the enlarged diameter bore portion 12b until the distal end 15 abuts the radial flange portion 14a of the core member 14, the sharp edges 43a of the chuck ring 43 are expanded radially outward by the distal end 15. The sharp edges 43a are then constricted radially inward by the restoring force thereof and prevent the hose 15 from sliding and being removed from the hose end fitting 41. It is noted that the inner diameter of the sharp edges 43a is preferable to be equal to or smaller than the outer diameter of the hose by 0.05 to 1 mm, more preferably 0.05 to 0.3 mm and that the thickness of the chuck ring 43 is preferable to be 0.2 to 2 mm.

Figure 16:
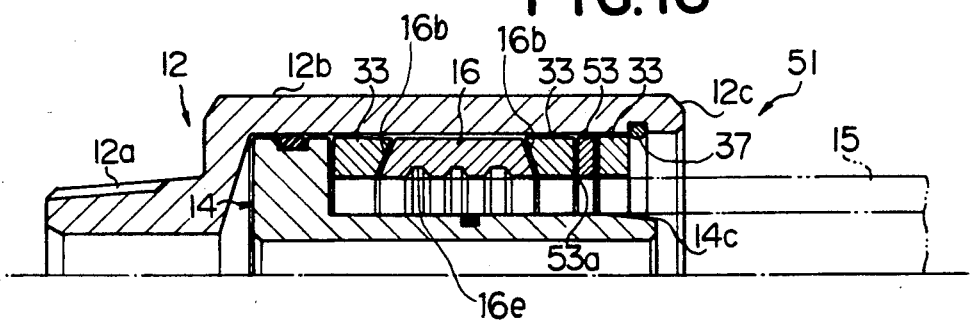
FIG. 16 is a longitudinal sectional view showing a hose end fitting constructed in accordance with a fifth embodiment of the present invention.
Figure 17:
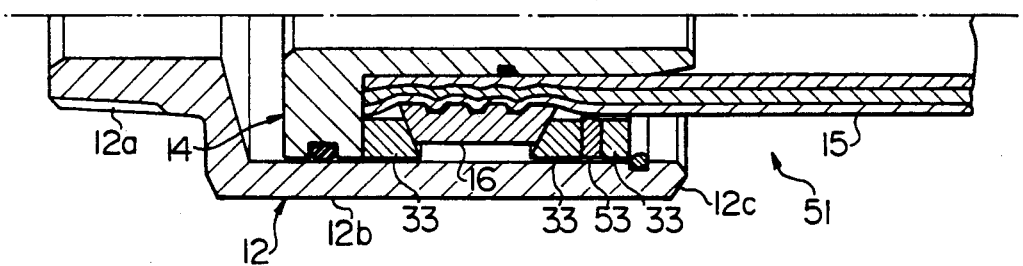
FIG. 17 is a longitudinal sectional view showing the hose connected to the hose end fitting of FIG. 16 by the axial outward movement of the core member shown in FIG. 16 from the position of FIG. 16.

Referring to FIGS. 16 through 18, there is shown a hose end fitting 51 for sealed connection to a hose, which is constructed in accordance with a fifth embodiment of the present invention. The parts and members substantially identical to those of the third embodiment are designated by like reference numerals for avoiding the detailed description.

Figure 18A:
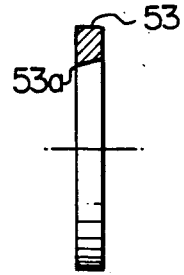
FIG. 18A is a side view, partly in section, showing the chuck ring shown in FIG. 16.
Figure 18B:
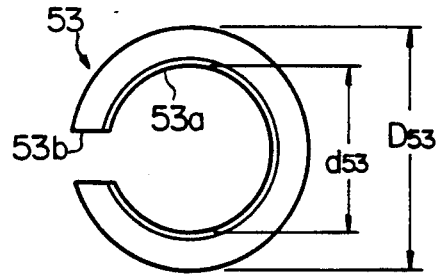
FIG. 18B is an end view showing the chuck ring shown in FIG. 16.
Figure 19:
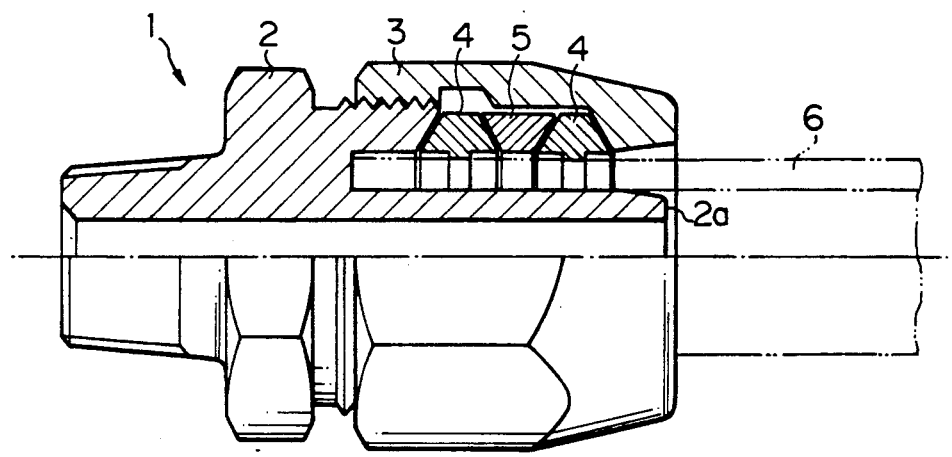
FIG. 19 is a longitudinal side view, partly in section, showing a conventional hose end fitting.

The hose end fitting 51 shown in FIG. 16 is characterized in that three inner, intermediate and outer annular receiving rings 33 are disposed within an enlarged diameter bore portion 12b of a main body 12 of the hose end fitting 51 so as to interpose a single annular crimping ring 16 between the inner receiving ring 33 and the intermediate receiving ring 33 and that an annular flat chuck ring 53 is interposed between the intermediate receiving ring 33 and the outer receiving ring 33. The chuck ring 53 is formed from plastics material (synthetic resin) such as polyacetal, nylon and the like or metal such as spring steel and the like. As shown in FIGS. 18A and 18B, the chuck ring 53 has a smaller diameter $d_{53}$ than the outer diameter $D_{15}$ of the hose 15, and also has a radially inwardly projecting sharp edge 53a. The chuck ring 53 is further provided with an axially extending cutout 53b so that it can be radially expandable and constrictible. For this configuration, when the hose 15 is inserted from the enlarged diameter bore portion 12b until the distal end 15a abuts the radial flange portion 14a of the core member 14, the sharp edge 53a of the chuck ring 53 is expanded radially outward by the distal end 15a. The sharp edge 53a is then constricted radially inward by the restoring force thereof and prevents the hose 15 from sliding and being removed from the hose end fitting 51. It is noted that the inner diameter of the sharp edge 53a is preferable to be equal to or smaller than the outer diameter of the hose by 0.05 to 1 mm, more preferably 0.05 to 0.3 mm and that the thickness of the chuck ring 53 is preferable to be 0.2 to 2 mm.

While certain representative embodiments and details have been shown for the purpose of illustrating the invention, it will be apparent to those skilled in this art that various changes and modifications may be made therein without departing from the scope of the invention.

We claim:

1. A hose end fitting for sealed connection to a multilayer hose, comprising:
    a first cylindrical member having a reduced diameter bore portion and an enlarged diameter bore portion connected to said reduced diameter bore portion, the reduced diameter bore portion being formed with an axial reduced bore extending therethrough and the enlarged diameter bore portion being formed with an axial enlarged bore extending therethrough;
    a second cylindrical member axially slidable within said axial enlarged bore of said enlarged diameter bore portion of said first cylindrical member and having a radial flange portion and an axial tubular portion extending from said radial flange portion, the radial flange portion being provided with a first sealing member, and the axial tubular portion being formed with a through bore communicating with said axial reduced bore of said reduced diameter bore portion of said first cylindrical member and provided with a second sealing member, and said first sealing member serving so that said second cylindrical member is axially slid along and on said larger diameter bore portion of said first cylindrical member, as a piston, when internal pressure is applied to said hose fitting;
    hose end gripping means provided within said axial enlarged bore of said enlarged diameter bore portion of said first cylindrical member and radially expandable and constrictible, a hose within said hose end gripping means and being gripped by said hose end gripping means which is radially constricted to grip said hose only by axial and outward movement of said second cylindrical member caused by internal fluid pressurization with the hose fitting; and stopping means received in said enlarged diameter bore portion and adapted to limit axial movement of said second cylindrical member and said hose end gripping means.

2. A hose end fitting as set forth in claim 1, wherein said second cylindrical member further has a receiving portion extending axially outward from said radial flange portion and having an inner inclined end face and wherein said stopping means comprises a stop member having an externally threaded shank portion with an inner inclined end face and wherein said hose end gripping means comprises an annular crimping ring having at its one end an outer inclined end face engageable with said inner inclined end face of said receiving portion of said second cylindrical member and at the other end an outer inclined end face engageable with said inner inclined end face of said stop member.

3. A hose end fitting as set forth in claim 2, wherein said crimping ring is formed with a cutout axially extending therethrough and has a plurality of circumferential ridges projecting radially inward from an inner peripheral surface of said crimping ring, each ridge having an inner diameter equal to or smaller than an outer diameter of said hose.

4. A hose end fitting as set forth in claim 1, wherein said stopping means comprises a stop member having an externally threaded shank portion with an inner frustoconical surface and wherein said hose end gripping means comprises an annular crimping ring having at its one end a flat end face engageable with said radial flange portion of said second cylindrical member and at its outer periphery an outer frustoconical surface engageable with said inner frustoconical surface of said stop member.

5. A hose end fitting as set forth in claim 4, wherein said crimping ring is formed at its outer periphery with a plurality of axially extending slits and at its inner periphery with a plurality of circumferentially extending grooves and a circumferential teeth projecting radially inward from said inner periphery, the teeth having an inner diameter equal to or smaller than an outer diameter of said hose.

6. A hose end fitting for sealed connection to a multilayer hose, comprising:

a first cylindrical member having a reduced diameter bore portion and an enlarged diameter bore portion connected to said reduced diameter bore portion, the reduced diameter bore portion being formed with an axial reduced bore extending therethrough and the enlarged diameter bore portion being formed with an axial enlarged bore extending therethrough;

a second cylindrical member axially slidable within said axial enlarged bore of said enlarged diameter bore portion of said first cylindrical member and having a radial flange portion and an axial tubular portion extending from said radial flange portion, the radial flange portion being provided with a first sealing member, and the axial tubular portion being formed with a through bore communicating with said axial reduced bore of said reduced diameter bore portion of said first cylindrical member and provided with a second sealing member and said first sealing member serving so that said second cylindrical member is axially slid along and on said larger diameter bore portion of said first cylindrical member, as a piston, when internal pressure is applied to said hose fitting;

hose end gripping means provided within said axial enlarged bore of said enlarged diameter bore portion of said first cylindrical member and radially expandable and constrictible, a hose within said hose gripping means and being gripped by said hose end gripping means which is radially constricted to grip said hose only by axial and outward movement to said second cylindrical member caused by internal fluid pressurization with the hose fitting;

a plurality of receiving rings disposed adjacent to said hose end gripping means therebetween; and stopping means received in said enlarged diameter bore portion and adapted to limit axial movement of said second cylindrical member, said hose end gripping means and said receiving rings.

7. A hose end fitting as set forth in claim 6, wherein said hose end gripping means comprises a plurality of annular crimping rings each having outer inclined end faces at its opposite ends and wherein said stopping means comprises an annular stop ring and wherein said receiving rings have inner inclined end faces engageable with said outer inclined end faces of said crimping rings.

8. A hose end fitting as set forth in claim 7, wherein each of said crimping rings is formed with a cutout axially extending therethrough and has a circumferential tooth projecting radially inward from an inner peripheral surface of said crimping ring and having an inner diameter equal to or smaller than an outer diameter of said hose.

9. A hose end fitting as set forth in claim 7, wherein each of said crimping rings is formed with a cutout axially extending therethrough and has an inner serrated portion at its inner periphery, the serrated portion having an inner diameter equal to or smaller than an outer diameter of said hose.

10. A hose end fitting as set forth in claim 7, wherein each of said crimping rings is formed with a cutout axially extending therethrough and has a plurality of circumferentially extending grooves each having trapezoidal section at its inner periphery, the inner periphery having an inner diameter equal to or smaller than an outer diameter of said hose.

11. A hose end fitting as set forth in claim 7, wherein each of said crimping rings is formed with a cutout axially extending therethrough and has inner circumferential ridges at opposite ends of an inner periphery of said crimping ring, each ridge having an inner diameter equal to or smaller than an outer diameter of said hose.

12. A hose end fitting as set forth in claim 6, wherein said hose end gripping means comprises an annular crimping ring having first and second outer inclined end faces and wherein said stopping means comprises an annular stop ring and wherein said plurality of receiving rings comprise an inner receiving ring interposed between said radial flange portion of said second cylindrical member and said crimping ring and having an inner inclined end face engageable with said first outer inclined end face of said crimping ring, and an outer receiving ring interposed between said crimping ring and said annular stop ring and having an inner inclined end face engageable with said second outer inclined end face of said crimping ring.

13. A hose end fitting as set forth in claim 12, which further comprises a chuck ring interposed between said inner receiving ring and said crimping ring.

14. A hose end fitting as set forth in claim said chuck ring has at its inner periphery radially inwardly projecting sharp edges which are radially expandable and constrictible, each edge having an inner diameter equal to or smaller than an outer diameter of said hose.

15. A hose end fitting as set forth in claim 13, wherein said chuck ring is formed from spring steel such as stainless steel and the like and frustoconical in shape.

16. A hose end fitting as set forth in claim 12, wherein said crimping ring has a plurality of circumferential grooves at its inner periphery.

17. A hose end fitting as set forth in claim 6, wherein said hose end gripping means comprises an annular crimping ring having first and second outer inclined end faces and wherein said stopping means comprises an annular stop ring and wherein said plurality of receiving rings comprise an inner receiving ring, an intermediate receiving ring, and an outer receiving ring, the inner receiving ring being interposed between said radial flange portion of said second cylindrical member and said crimping ring and having an inner inclined end face engageable with said first outer inclined end face of said crimping ring, the intermediate receiving ring having an inner inclined end face engageable with said second outer inclined end face of said crimping ring.

18. A hose end fitting as set forth in claim 17, wherein said crimping ring has a plurality of circumferential grooves at its inner periphery.

19. A hose end fitting as set forth in claim 6, which further comprises a chuck ring interposed between said intermediate and outer receiving rings.

20. A hose end fitting as set forth in claim 18, wherein said chuck ring is formed with an axial cutout extending therethrough and has at its inner periphery a radially inwardly projecting sharp edge which is radially expandable and constrictible and has an inner diameter equal to or smaller than an outer diameter of said hose.

21. A hose end fitting as set forth in claim 18, wherein said chuck ring is formed from steel such as spring steel and the like, and flat in shape.

22. A hose end fitting as set forth in claim 18, wherein said chuck ring is formed from plastics material such as polyacetal, nylon and the like, and flat in shape.

23. A method of coupling a multilayer hose end to a hose end fitting with a sealed connection wherein said fitting comprises:

a first cylindrical member having a reduced diameter bore portion and an enlarged diameter bore portion connected to said reduced diameter bore portion, the reduced diameter bore portion being formed with an axial reduced bore extending therethrough and the enlarged diameter bore portion being formed with an axial enlarged bore extending therethrough;

a second cylindrical member axially slidable within said axial enlarged bore of said enlarged diameter bore portion of said first cylindrical member and having a radial flange portion and an axial tubular portion extending from said radial flange portion, the radial flange portion being provided with a first sealing member, and the axial tubular portion being formed with a through bore communicating with said axial reduced bore of said reduced diameter bore portion of said first cylindrical member and provided with a second sealing member and said first sealing member serving so that said second cylindrical member is axially slid along and on said larger diameter bore portion of said first cylindrical member, as a piston, when internal pressure is applied to said hose fitting;

hose end gripping means provided within said axial enlarged bore of said enlarged diameter bore portion of said first cylindrical member and radially expandable and constrictible; and stopping means received in said enlarged diameter bore portion and adapted to limit axial movement of said second cylindrical member and said hose end gripping means;

comprising the steps of inserting said hose within said gripping means and radially constricting said hose end gripping means to grip said hose only by axial and outward movement of said second cylindrical member caused by internal fluid pressurization within the hose fitting.

* * * * *